US012639329B2

(12) United States Patent
Liu et al.

(10) Patent No.: US 12,639,329 B2
(45) Date of Patent: May 26, 2026

(54) GENERATION OF TABLE METADATA IN HTAP DATABASE DURING FLUSH

(71) Applicants: Lemon Inc., Grand Cayman (KY); Douyin Vision Co., Ltd., Beijing (CN); Beijing Zitiao Network Technology Co., Ltd., Beijing (CN)

(72) Inventors: Ye Liu, Los Angeles, CA (US); Li Zhang, Los Angeles, CA (US); Lutong Zhang, Los Angeles, CA (US); Mu Xiong, Beijing (CN); Yupeng Jin, Beijing (CN); Jie Zhou, Beijing (CN); Bingyu Liu, Beijing (CN); Jianjun Chen, Los Angeles, CA (US)

(73) Assignees: Lemon Inc., Grand Cayman (KY); Douyin Vision Co., Ltd., Beijing (CN); Beijing Zitiao Network Technology Co., Ltd., Beijing (CN)

( * ) Notice: Subject to any disclaimer, the term of this patent is extended or adjusted under 35 U.S.C. 154(b) by 4 days.

(21) Appl. No.: 18/930,449

(22) Filed: Oct. 29, 2024

(65) Prior Publication Data

US 2026/0119519 A1 Apr. 30, 2026

(51) Int. Cl.
*G06F 16/25* (2019.01)
*G06F 16/22* (2019.01)
*G06F 16/2453* (2019.01)

(52) U.S. Cl.
CPC ........ *G06F 16/254* (2019.01); *G06F 16/2282* (2019.01); *G06F 16/24542* (2019.01)

(58) Field of Classification Search
CPC ............... G06F 16/2453; G06F 16/254; G06F 16/24542; G06F 16/2282

USPC .......................................................... 707/602
See application file for complete search history.

(56) References Cited

U.S. PATENT DOCUMENTS

| | | | | |
|---|---|---|---|---|
| 11,789,936 | B2 | 10/2023 | Chen et al. | |
| 2023/0062198 | A1* | 3/2023 | Chen | G06F 16/283 |
| 2025/0036650 | A1* | 1/2025 | Gao | G06F 16/273 |

OTHER PUBLICATIONS

Chen, J. et al., "ByteHTAP: ByteDance's HTAP System with High Data Freshness and Strong Data Consistency," Proceedings of the VLDB Endowment, vol. 15, No. 12, Aug. 1, 2022, 14 pages.

* cited by examiner

*Primary Examiner* — Hung T Vy
(74) *Attorney, Agent, or Firm* — Alleman Hall LLP

(57) ABSTRACT

A hybrid transactional/analytical processing (HTAP) database is provided, which includes an online transaction processing (OLTP) engine, an online analytical processing (OLAP) engine provided separately from the OLTP engine, and a shared storage holding data. The shared storage includes an OLTP storage holding data in row format for responding to queries of the OLTP engine, and an OLAP storage holding data in column format for responding to queries of the OLAP engine. The OLAP storage includes a delta store configured to record changes made to the OLTP storage in an update, and a base store configured to implement the update from the delta store on data in persistent storage in a flush. The HTAP database further includes a table metadata service configured to generate and perform operations on table metadata of the data that is updated in the flush.

20 Claims, 5 Drawing Sheets

300

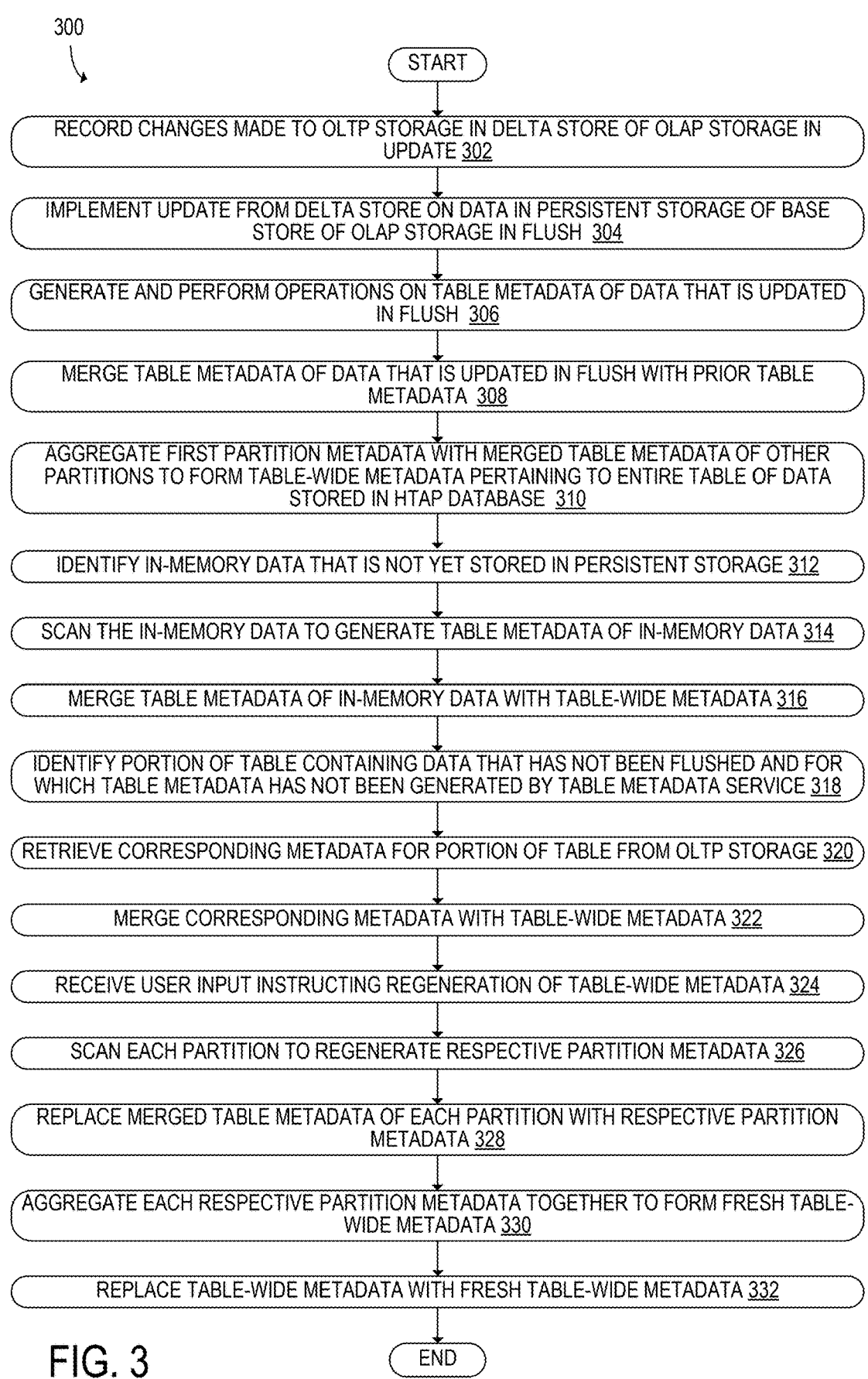

START

RECORD CHANGES MADE TO OLTP STORAGE IN DELTA STORE OF OLAP STORAGE IN UPDATE 302

IMPLEMENT UPDATE FROM DELTA STORE ON DATA IN PERSISTENT STORAGE OF BASE STORE OF OLAP STORAGE IN FLUSH 304

GENERATE AND PERFORM OPERATIONS ON TABLE METADATA OF DATA THAT IS UPDATED IN FLUSH 306

MERGE TABLE METADATA OF DATA THAT IS UPDATED IN FLUSH WITH PRIOR TABLE METADATA 308

AGGREGATE FIRST PARTITION METADATA WITH MERGED TABLE METADATA OF OTHER PARTITIONS TO FORM TABLE-WIDE METADATA PERTAINING TO ENTIRE TABLE OF DATA STORED IN HTAP DATABASE 310

IDENTIFY IN-MEMORY DATA THAT IS NOT YET STORED IN PERSISTENT STORAGE 312

SCAN THE IN-MEMORY DATA TO GENERATE TABLE METADATA OF IN-MEMORY DATA 314

MERGE TABLE METADATA OF IN-MEMORY DATA WITH TABLE-WIDE METADATA 316

IDENTIFY PORTION OF TABLE CONTAINING DATA THAT HAS NOT BEEN FLUSHED AND FOR WHICH TABLE METADATA HAS NOT BEEN GENERATED BY TABLE METADATA SERVICE 318

RETRIEVE CORRESPONDING METADATA FOR PORTION OF TABLE FROM OLTP STORAGE 320

MERGE CORRESPONDING METADATA WITH TABLE-WIDE METADATA 322

RECEIVE USER INPUT INSTRUCTING REGENERATION OF TABLE-WIDE METADATA 324

SCAN EACH PARTITION TO REGENERATE RESPECTIVE PARTITION METADATA 326

REPLACE MERGED TABLE METADATA OF EACH PARTITION WITH RESPECTIVE PARTITION METADATA 328

AGGREGATE EACH RESPECTIVE PARTITION METADATA TOGETHER TO FORM FRESH TABLE-WIDE METADATA 330

REPLACE TABLE-WIDE METADATA WITH FRESH TABLE-WIDE METADATA 332

END

FIG. 3

GENERATION OF TABLE METADATA IN HTAP DATABASE DURING FLUSH

BACKGROUND

Databases are designed with various types of architecture. Online transaction processing (OLTP) architecture is oriented toward processing transactions. Like with a bank account, transactions tend to be simple and numerous, and may include queries such as read, insert, update, delete, etc. However, OLTP architecture lacks massively parallel processing (MPP) capability. In contrast, online analytical processing (OLAP) architecture is oriented toward processing data analysis. Queries handled by OLAP architecture tend to be more complex, involve more data, and take more time to complete. For example, OLAP architecture may be responsible for determining an average sale price over the past year of a particular product tracked by the database. Many database users have use for both types of processing using the same data, and thus a hybrid transactional/analytical processing (HTAP) database has been developed which includes both types of architecture in a single database.

In addition to merely storing data itself, the HTAP database has many uses for metadata or statistics about the data, such as data amount, data distribution, and number of distinct values, etc. One such use is providing the metadata to a query optimizer which can then determine how best to respond to the query. However, while the OLTP side of the HTAP database may be able to utilize existing mechanisms to collect metadata usable by its query optimizer, these mechanisms are activated by methods including random sampling, manual triggering of metadata collection by a user, and detecting invalid metadata upon querying the metadata. These existing mechanisms typically result in a large lump sum of metadata collection at once, which can be especially undesirable during times of already heavy system loads. Furthermore, the OLTP side uses relatively simple metadata, whereas the OLAP side of the HTAP database, which processes more complex queries, would benefit from query optimization and other features using appropriately more complex metadata.

SUMMARY

To address these issues, a hybrid transactional/analytical processing (HTAP) database is provided herein, which includes an online transaction processing (OLTP) engine, an online analytical processing (OLAP) engine provided separately from the OLTP engine, and a shared storage holding data. The shared storage may include an OLTP storage holding data in row format for responding to queries of the OLTP engine, and an OLAP storage holding data in column format for responding to queries of the OLAP engine. The OLAP storage may include a delta store configured to record changes made to the OLTP storage in an update, and a base store configured to implement the update from the delta store on data in persistent storage in a flush. The HTAP database may further include a table metadata service configured to generate and perform operations on table metadata of the data that is updated in the flush.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A illustrates a metadata generation and merging process of the HTAP database of FIG. 1, while

FIG. 3 shows an example flowchart of a method for metadata generation in an HTAP database according to one example of the present disclosure.

DETAILED DESCRIPTION

Figure 1:
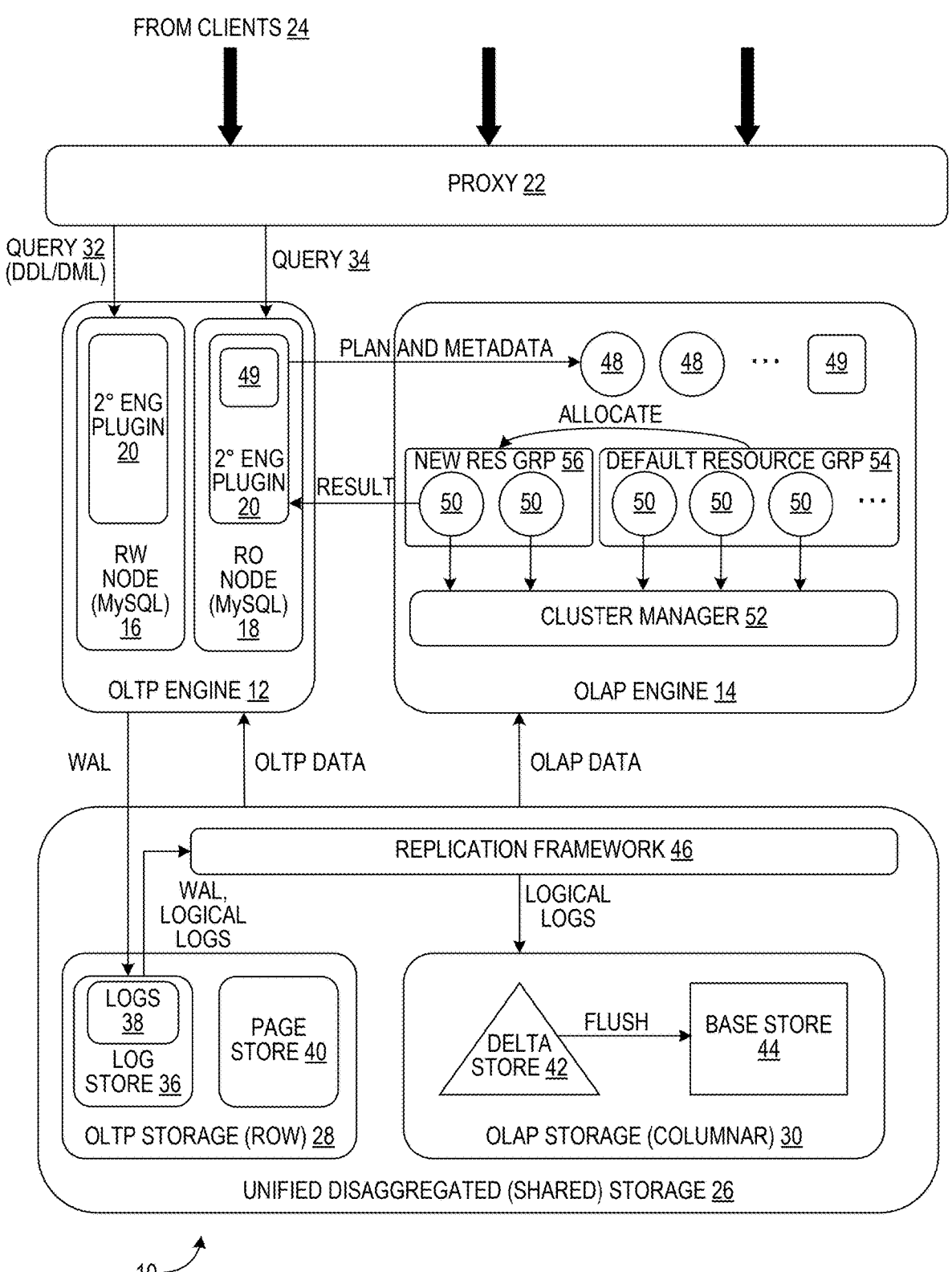
FIG. 1 illustrates a hybrid transactional/analytical processing (HTAP) database according to one example of the present disclosure.

FIG. 1 illustrates a hybrid transactional/analytical processing (HTAP) database 10 according to one example of the present disclosure. The HTAP database 10 may be hybridized in the sense that it includes both an online transaction processing (OLTP) engine 12 and an online analytical processing (OLAP) engine 14, which may be provided separately from the OLTP engine 12. That is, the HTAP database 10 may include separated compute engines. Keeping the two engines 12, 14 separate may allow each separate engine 12, 14 to exhibit peak performance for their respective workloads for which they are specialized while avoiding interference therebetween. Examples of HTAP databases with unified engines include SAP HANA and MEMSQL, and examples with separate engines include WILDFIRE and TIDB.

The OLTP engine 12 may include a read-write (RW) node 16 and a read-only (RO) node 18. Each node 16, 18 may include a respective secondary engine plugin 20, which is an extension that allows a proxy 22 to send all queries from clients 24 to the OLTP engine 12 and allow the OLTP engine 12 to determine which engine 12, 14 to use for a given query based on a variety of parameters such as query complexity. For example, data manipulation language (DML) queries and data definition language (DDL) queries may be sent only to the RW node 16, while other types of queries can be handled by either node 16, 18. By directing queries in this manner rather than at the proxy 22, the database 10 can support a read committed isolation level across both engines 12, 14, thereby guaranteeing the same results from either. For decreased latency, users may be given the option of sending queries directly to the OLAP engine 14 when the final destination is known from the start.

In contrast to the separate engines 12, 14, the HTAP database 10 may include a shared storage 26 holding data of multiple tenants. The shared storage 26 may be shared in the sense that it includes both an OLTP storage 28 holding data in row format for responding to queries of the OLTP engine 12, and an OLAP storage 30 holding data in column format for responding to queries of the OLAP engine 14. Typically, systems with separate compute engines also include separate storage, which commonly has low data freshness for OLAP queries.

The HTAP database 10 may be configured to support one unified application programming interface (API) and automatically route queries from the clients 24 to the OLTP engine 12 and OLAP engine 14 using the proxy 22. On a basic level, DML queries, DDL queries, simple queries, and queries otherwise suitable for OLTP (e.g., with predicates over indexes on OLTP tables) are included in queries 32 that are routed to the OLTP engine 12, while complex queries, such as those with multiple joins and aggregations, are included in queries 34 that are routed to the OLAP engine 14. In this manner, interference between OLTP and OLAP workloads is avoided while queries are performed by the appropriate engine 12, 14.

The OLTP storage 28 may include a log store 36 configured to persist logs 38 and a page store 40 configured to store versions of data pages and apply the logs 38 to construct current versions of the data pages. The logs 38 may include various types of logs, such as redo logs, logical logs, and write-ahead logs (WAL). The page store 40 may use redo logs to construct the data pages, while logical logs such as MYSQL binary logs for committed DML transactions may be passed on to the OLAP storage 30. The OLAP storage 30 may include a delta store 42 configured to record changes made to the OLTP storage 28, and a base store 44 configured to implement updates from the delta store 42 in persistent storage in a flush. Although the OLAP storage 30 as a whole may be columnar, it will be appreciated that the delta store 42 may store changes in row format until the changes are implemented to the base store 44 in column format. The delta store 42 may be in-memory while the base store 44 may be on-disk.

In order to ensure data freshness of the base store 44 for OLAP queries, the OLAP storage 30 may further include a replication framework 46 configured to perform log shipping of the logs 38 from the log store 36 to the delta store 42. In particular, the replication framework 46 may ship logical logs to the OLAP storage 30. The replication framework 46 may distribute the logs 38 to multiple storage nodes for each partition to build a columnar data store residing on different storage nodes from its corresponding row store.

The OLAP engine 14 may include a plurality of coordinators 48 for distributed plan generation and optimization, and a plurality of data servers 50 for distributed plan execution. A centralized cluster manager 52 may allow users to create resource groups out of the data servers 50, and may allocate data servers 50 from a default resource group 54 to a new resource group 56 as needed according to workload. For processing the query 34 at the OLAP engine 14, the secondary engine plugins 20 may include a query optimizer 49 to generate a MYSQL-compatible query plan and perform simple optimizations before sending the partially optimized query plan, together with required metadata, to the coordinators 48 for distributed plan generation and optimization at another query optimizer 49. After optimization, a co-located query scheduler may send fragments of the plan to a set of the data servers 50 for execution, which may read the data from the OLAP storage 30 and periodically send heartbeats to the cluster manager 52. The final result from the query may be buffered at one of the data servers 50 and fetched by the secondary engine plugins 20.

On a basic level, the OLTP engine 12, OLAP engine 14, and shared storage 26 may be made up of a plurality of servers working together to form a compute layer (e.g., the OLTP engine 12 and the OLAP engine 14) and a storage layer (e.g., the shared storage 26). In one example, the HTAP database 10 includes a plurality of clusters managed by the cluster manager 52, and each cluster includes six database servers 50, with four data servers 50 forming the OLAP engine 14 of that cluster and one RW node 16 and one RO node forming the OLTP engine 12 of that cluster. The shared storage 26 may include a plurality of storage servers, for example, three per cluster. It will be appreciated that this is merely one example and other suitable numbers of machines may be utilized.

Figure 2A:
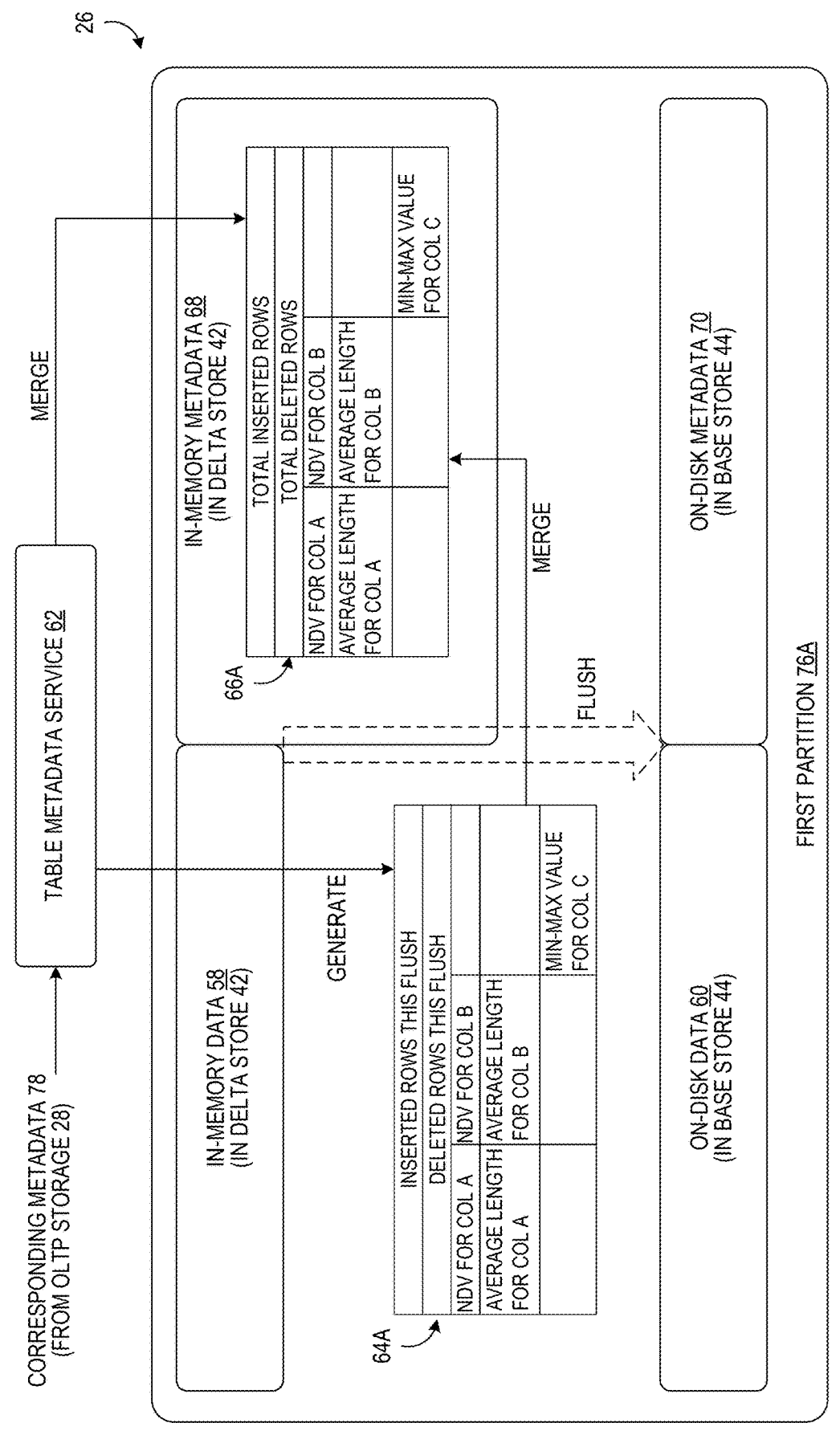
Figure 2B:
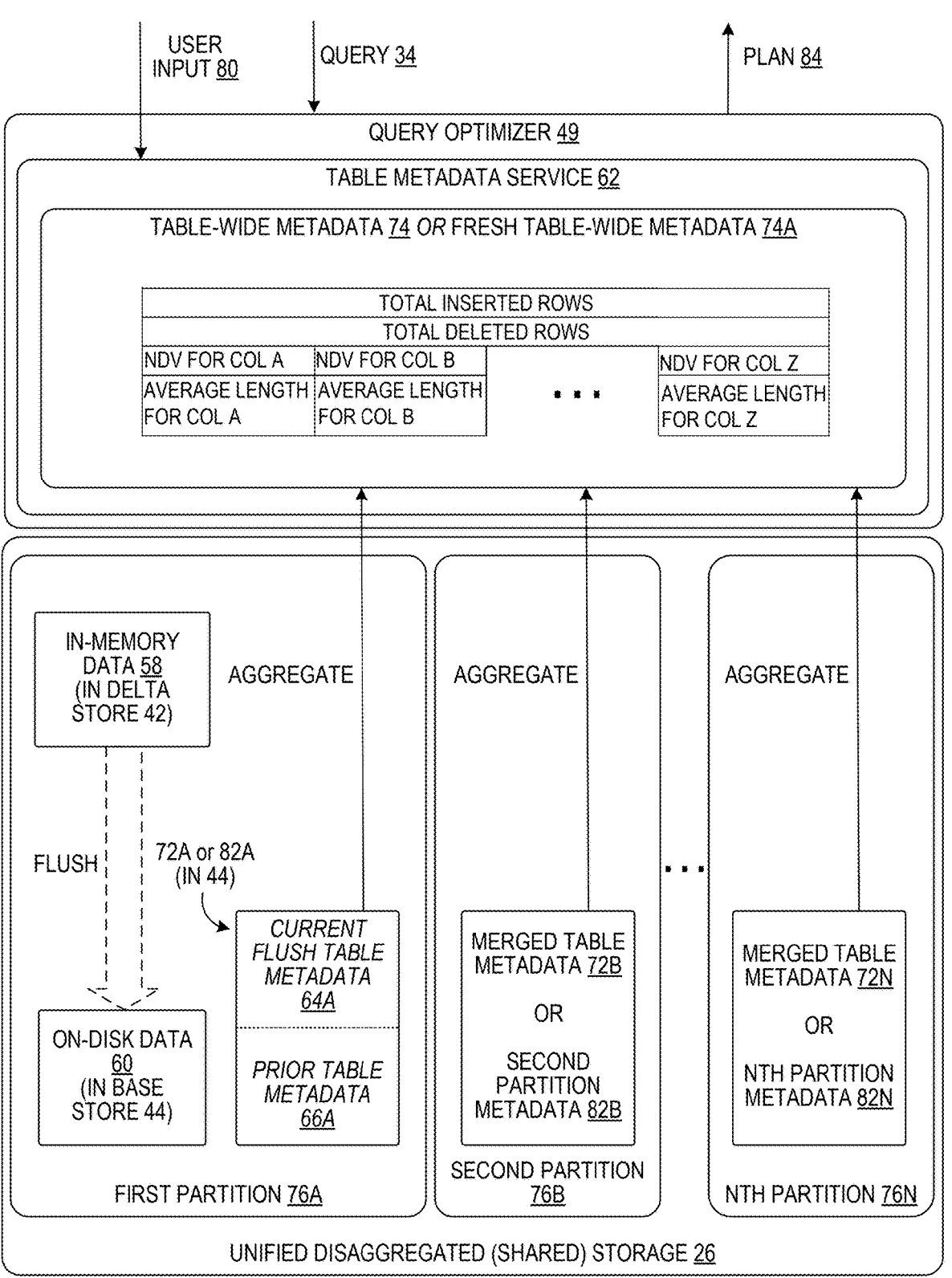
FIG. 2B illustrates a metadata aggregation process.

FIG. 2A illustrates a metadata generation and merging process of the HTAP database 10, while FIG. 2B illustrates a metadata aggregation process. The delta store 42 may contain in-memory data 58, and the base store 44 may contain on-disk data 60 that is persisted, by contrast. As discussed previously, the delta store 42 records changes made to the OLTP storage 28 in memory while the base store 44 implements updates from the delta store 42 in persistent storage in a flush. During the flush, a table metadata service 62 of the OLAP engine 14 may be configured to generate and perform operations on table metadata 64A of the data that is updated in the flush. Generating the table metadata 64A in response to the flush allows the table metadata service 62 to collect metadata corresponding to the most recently updated on-disk data 60, and then operations utilizing metadata can be made more accurate by using the table metadata 64A.

The table metadata service 62 may be further configured to merge the table metadata 64A of the data that is updated in the flush with prior table metadata 66A. The merging is shown here in the delta store 42, within in-memory metadata 68. However, the in-memory metadata 68 is periodically flushed as well, becoming on-disk metadata 70, and further processes may use either metadata 68, 70. Once merged, the prior table metadata 66A with the table metadata 64A from the current flush become merged table metadata 72A (see FIG. 2B). It will be appreciated that the prior table metadata 66A may have already been previously merged any number of times, that is, it may be constantly updated with each flush. By merging the metadata updates with the prior table metadata 66A in this manner, the stored metadata 68, 70 can be incrementally and iteratively updated as the corresponding on-disk data 60 is updated in the base store 44, ensuring that recent update are accounted for when retrieving metadata for performing operations thereon. Furthermore, breaking the updating of the metadata into flushes reduces resource utilization at any one time compared to running a full recollection of metadata of the entire base store 44.

The type of metadata included in the table metadata 64A and the merged table metadata 72A depend on the operations that will be performed using the generated metadata. For example, the merged table metadata 72A may include table-level metadata including one or more of total inserted row count, total deleted row count, and total final row count. For the table metadata 64A from the flush, the "total inserted row" count may be "inserted rows this flush," and the "total deleted row" count may be "deleted rows this flush," etc. Rows added and deleted are intrinsically included in the process of flushing data and are therefore easily generated. Total final row count can be easily calculated by taking the total inserted row count minus the total deleted row count, to obtain how many rows remain active at the time the metadata is used. Furthermore, since the flush may not involve all data held in memory let alone all data stored in the base store 44, it will be appreciated that the table metadata 64A from the flush may lack some values present in the prior table metadata 66A, or may insert new rows compared to the prior table metadata 66A, etc.

In another example, the table metadata 64A may include column-level metadata including at least one of average length for variable length (varlength) columns, number of distinct values (NDV), and a minimum-maximum (min-max) value. The illustrated example shows three columns, A-C. Columns A and B may be variable length and therefore include average length for the respective column, while Column C may be a fixed length for which a min-max value is applicable. The average length may be calculated by a simple command such as "Total_Length_of_the_Column_this_flush/(Total_Inserted_Rows_this_flush−Total_Deleted_Rows_this_flush)." The min-max value maybe easily obtained by intentionally keeping the minimum and maximum value during the flush. Columns A and B also include the NDV count for the respective column, which may be estimated using a HyperLogLog (HLL) algorithm, for example.

For merged values in the merged table metadata 72A, inserted and deleted rows can easily be merged by adding the incremental values from each flush to the previously collected values. The NDV count can be merged easily with an algorithm such as the HLL algorithm for newly inserted data, but for newly deleted data, results may be calibrated with a Poisson regression with the total deleted rows in the table level. The average length of a varlength column can be merged with a simple equation such as "(Total_Length-_of_the_Column_newly_flush+Total_Length_of_the_Column_previous_flushes)/(Total_Inserted_Rows_newly_flush+Total_Inserted_Rows_previous_flushes−Total_Deleted_Rows_newly_flush−Total_Deleted_Rows_previous_flushes)." Finally, the min-max value can be merged by comparing the min-max value of the table metadata 64A from the flush with the min-max of the prior table metadata 66A and taking the minimum and maximum values of the two. Once the merged table metadata 72A is produced, it can be used as the prior table metadata 66A when merging with new table metadata 64A from the next flush.

In some cases, in-memory data 58 stays in memory and is not flushed to be persisted in the base store 44. In such a case, the table metadata service 62 may be further configured to identify the in-memory data 58 that is not yet stored in the persistent storage, scan the in-memory data 58 to generate table metadata 64A of the in-memory data 58, and merge the table metadata 64A of the in-memory data 58 with the merged table metadata 72A, or as will be explained below with reference to FIG. 2B, with table-wide metadata 74. In this manner, the collected metadata can be made more complete by including metadata from the in-memory data 58.

The on-disk data 60 and base store 44 may be divided into a number of partitions. The merged table metadata 72A discussed above may be first partition metadata pertaining to data of a first partition 76A. As illustrated, the table metadata service 62 may be further configured to aggregate the first partition metadata with merged table metadata 72B, 72N of other partitions (e.g., second partition 76B . . . nth partition 76N) to form table-wide metadata 74 pertaining to an entire table of data stored in the HTAP database 10. Accordingly, the table metadata service 62 may be able to incrementally gather table metadata until the table-wide metadata 74 is formed. As such, operations performed on the table-wide metadata 74 may be more accurate without causing jumps in resource consumption.

In some cases, data may exist in the base store 44 without any flush having occurred during certain time windows, resulting in a deficiency in the table-wide metadata 74. To remedy this situation, as shown in FIG. 2A, the table metadata service 62 may be further configured to identify a portion of the table containing data that has not been flushed and for which table metadata 64A has not been generated by the table metadata service 62. This may be done by recognizing that the insert rows and delete rows in the table-wide metadata 74 are both zero, for example. Next, the table metadata service 62 may retrieve corresponding metadata 78 for the portion of the table from the OLTP storage 28. Then, the table metadata service 62 may merge the corresponding metadata 78 with the merged table metadata 72A or the table-wide metadata 74. While the OLTP side of the HTAP database 10 maintains fewer categories of metadata than the OLAP side and therefore may be less desirable than the full table metadata 64A that would result from a flush on the OLAP side, the corresponding metadata 78 from the OLTP side is preferable than no metadata when performing operations using the metadata.

Another way to improve the table-wide metadata 74 is for the table metadata service 62 to be further configured to receive user input 80 instructing regeneration of the table-wide metadata 74. The user may choose to instruct regeneration when the user notices that the existing table-wide metadata 74 seems off or stale, and the regeneration may be instructed by, for example, a DDL or a command. In this manner, the user may be able to wait until either the resource usage allows for a full-scale metadata regeneration, or determine that the freshness of the metadata is worth the resource usage. In response to the user input 80, the table metadata service 62 may be configured to scan each partition 76A, 76B . . . 76N to regenerate respective partition metadata 82A, 82B . . . 82N, and replace the merged table metadata 72A of each partition 76A, 76B . . . 76N with the respective partition metadata 82A, 82B . . . 82N which was freshly generated. As before, the table metadata service 62 may be configured to aggregate each respective partition metadata 82A, 82B . . . 82N together to form fresh table-wide metadata 74A, and then replace the table-wide metadata 74 with the fresh table-wide metadata 74A.

Finally, once the table-wide metadata 74 is sufficiently complete, various operations may be performed. For example, the query optimizer 49 of the OLAP engine 14 may be configured to receive the query 34 and, based at least on the table metadata 64A (or the table-wide metadata 74), generate a plan 84 for responding to the query 34. More specifically, the query optimizer 49 may optimize an initial version of the plan 84 received from intervening components. In some instances, the query optimizer 49 of the OLAP engine 14 may include the table metadata service 62, and in others, the table metadata service 62 may be centrally provided elsewhere. By knowing the table metadata 64A such as total rows, average length, NDV, and min-max value, the query optimizer 49 can prepare an efficient and accurate plan 84 for responding to the query 34 without overutilizing resources. Particularly in a multi-tenant environment, this can allow the HTAP database 10 to serve multiple clients simultaneously without an undue loss of responsiveness.

FIG. 3 shows an example flowchart of a method 300 for metadata generation in an HTAP database according to one example of the present disclosure. The method 300 may be implemented by the HTAP database 10 illustrated in FIG. 1. Thus, the HTAP database may include an online transaction processing (OLTP) engine, an online analytical processing (OLAP) engine provided separately from the OLTP engine, and a shared storage holding data, the shared storage including an OLTP storage holding data in row format for responding to queries of the OLTP engine, and an OLAP storage holding data in column format for responding to queries of the OLAP engine.

With reference to FIG. 3, at 302, the method 300 may include recording changes made to the OLTP storage in a delta store of the OLAP storage in an update. At 304, the method 300 may include implementing the update from the delta store on data in persistent storage of a base store of the OLAP storage in a flush. Then, at 306, the method 300 may include generating and performing operations on table metadata of the data that is updated in the flush. In this manner, the OLAP engine may generate metadata that is useful when performing various operations, as opposed to using the metadata used by the OLTP engine. Furthermore, by generating the table metadata of the data that is updated in the flush, an incremental approach can be taken to building the stored metadata, which avoids overloading the HTAP database or delaying the operations requested by a user. The table metadata may include, for example, table-level metadata including one or more of total inserted row count, total deleted row count, and total final row count, and/or column-level metadata including at least one of average length for variable length columns, number of distinct values, and a minimum-maximum value. These types of metadata may be useful for a variety of operations such as query optimization.

At 308, the method 300 may include merging the table metadata of the data that is updated in the flush with prior table metadata. Thus, the HTAP database may be able to incrementally generate new metadata to be added on to previously generated metadata and slowly build a complete collection of table metadata of the OLAP storage. In some cases, the stored data may be divided into partitions. In this case, the merged table metadata may be first partition metadata pertaining to data of a first partition, and at 310, the method 300 may include aggregating the first partition metadata with merged table metadata of other partitions to form table-wide metadata pertaining to an entire table of data stored in the HTAP database. Thus, the OLAP engine may have access to the table-wide metadata forming a complete picture of the stored data for performing operations pertaining to data on more than one partition.

By incrementally generating or updating the metadata during flushes, some portions of data may be omitted. Accordingly, the method 300 provides some techniques for augmenting the flush-based metadata generation. For example, at 312, the method 300 may include identifying in-memory data that is not yet stored in the persistent storage. At 314, the method 300 may include scanning the in-memory data to generate table metadata of the in-memory data. Finally, at 316, the method 300 may include merging the table metadata of the in-memory data with the table-wide metadata. Additionally or alternatively, at 318, the method 300 may include identifying a portion of the table containing data that has not been flushed and for which table metadata has not been generated by the table metadata service. Then, at 320, the method 300 may include retrieving corresponding metadata for the portion of the table from the OLTP storage, and at 322, merging the corresponding metadata with the table-wide metadata. The OLTP metadata may be less complex than OLAP metadata, but is preferable to having no metadata when performing operations in the OLAP engine.

In addition, the user may be able to manually trigger a refresh of the metadata, for example, if the user notices that the results of the operations performed on the metadata are substandard. Accordingly, at 324, the method 300 may include receiving user input instructing regeneration of the table-wide metadata. At 326, the method 300 may include scanning each partition to regenerate respective partition metadata. At 328, the method 300 may include replacing the merged table metadata of each partition with the respective partition metadata. At 330, the method 300 may include aggregating each respective partition metadata together to form fresh table-wide metadata. Finally, at 332, the method 300 may include replacing the table-wide metadata with the fresh table-wide metadata.

Once the HTAP database obtains the table metadata, then various operations (see 306) can be performed using the table metadata. For example, with a query optimizer, the method 300 may include receiving a query, and based at least on the table metadata, generating a plan for responding to the query. By using the incrementally generated metadata, the OLAP engine may be able to optimize plans for responding to received queries with increased accuracy as well as decreased resource and time consumption. It will be appreciated that other suitable operations may be performed on the table metadata.

Figure 4:
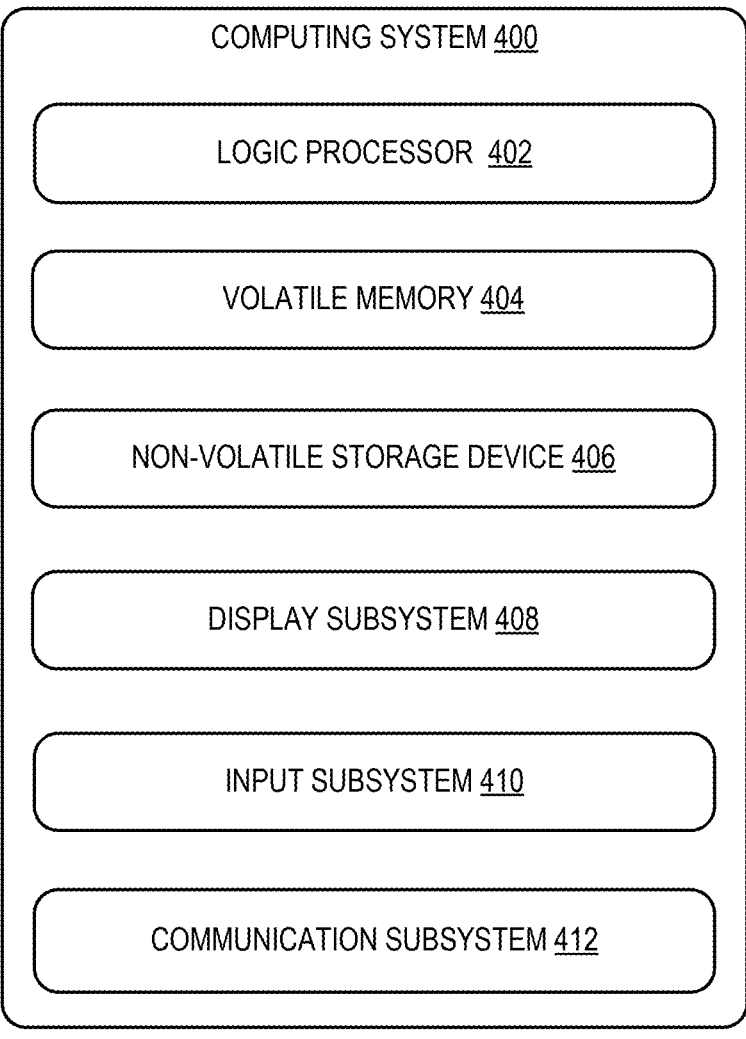
FIG. 4 shows a schematic view of an example computing environment in which the HTAP database of FIG. 1 may be enacted.

FIG. 4 schematically shows a non-limiting embodiment of a computing system 400 that can enact one or more of the methods and processes described above. Computing system 400 is shown in simplified form. Computing system 400 may embody HTAP database 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 4.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs provide additional description of the subject matter of the present disclosure. One aspect provides a hybrid transactional/analytical processing (HTAP) database. The HTAP database comprises an online transaction processing (OLTP) engine, an online analytical processing (OLAP) engine provided separately from the OLTP engine, and a shared storage holding data. The shared storage includes an OLTP storage holding data in row format for responding to queries of the OLTP engine, and an OLAP storage holding data in column format for responding to queries of the OLAP engine. The OLAP storage includes a delta store configured to record changes made to the OLTP storage in an update, and a base store configured to implement the update from the delta store on data in persistent storage in a flush. The HTAP database further includes a table metadata service configured to generate and perform operations on table metadata of the data that is updated in the flush. In this aspect, additionally or alternatively, the table metadata service is further configured to merge the table metadata of the data that is updated in the flush with prior table metadata. In this aspect, additionally or alternatively, the merged table metadata is first partition metadata pertaining to data of a first partition, and the table metadata service is further configured to aggregate the first partition metadata with merged table metadata of other partitions to form table-wide metadata pertaining to an entire table of data stored in the HTAP database. In this aspect, additionally or alternatively, the table metadata service is further configured to identify in-memory data that is not yet stored in the persistent storage, scan the in-memory data to generate table metadata of the in-memory data, and merge the table metadata of the in-memory data with the table-wide metadata. In this aspect, additionally or alternatively, the table metadata service is further configured to identify a portion of the table containing data that has not been flushed and for which table metadata has not been generated by the table metadata service, retrieve corresponding metadata for the portion of the table from the OLTP storage, and merge the corresponding metadata with the table-wide metadata. In this aspect, additionally or alternatively, the table metadata service is further configured to receive user input instructing regeneration of the table-wide metadata, scan each partition to regenerate respective partition metadata, replace the merged table metadata of each partition with the respective partition metadata, aggregate each respective partition metadata together to form fresh table-wide metadata, and replace the table-wide metadata with the fresh table-wide metadata. In this aspect, additionally or alternatively, the table metadata includes table-level metadata including one or more of total inserted row count, total deleted row count, and total final row count. In this aspect, additionally or alternatively, the table metadata includes column-level metadata including at least one of average length for variable length columns, number of distinct values, and a minimum-maximum value. In this aspect, additionally or alternatively, the OLAP engine further comprises a query optimizer configured to receive a query and, based at least on the table metadata, generate a plan for responding to the query. In this aspect, additionally or alternatively, the OLTP storage comprises a log store configured to persist logs, and a page store configured to store versions of data pages and apply the logs to construct current versions of the data pages, and the shared storage comprises a replication framework configured to perform log shipping of the logs from the log store to the delta store.

Another aspect provides a method for metadata generation in a hybrid transactional/analytical processing (HTAP) database, the HTAP database including an online transaction processing (OLTP) engine, an online analytical processing (OLAP) engine provided separately from the OLTP engine, and a shared storage holding data, the shared storage including an OLTP storage holding data in row format for responding to queries of the OLTP engine, and an OLAP storage holding data in column format for responding to queries of the OLAP engine. The method comprises recording changes made to the OLTP storage in a delta store of the OLAP storage in an update, implementing the update from the delta store on data in persistent storage of a base store of the OLAP storage in a flush, and generating and performing operations on table metadata of the data that is updated in the flush. In this aspect, additionally or alternatively, the method further comprises merging the table metadata of the data that is updated in the flush with prior table metadata. In this aspect, additionally or alternatively, the merged table metadata is first partition metadata pertaining to data of a first partition, and the method further comprises aggregating the first partition metadata with merged table metadata of other partitions to form table-wide metadata pertaining to an entire table of data stored in the HTAP database. In this aspect, additionally or alternatively, the method further comprises identifying in-memory data that is not yet stored in the persistent storage, scanning the in-memory data to generate table metadata of the in-memory data, and merging the table metadata of the in-memory data with the table-wide metadata. In this aspect, additionally or alternatively, the method further comprises identifying a portion of the table containing data that has not been flushed and for which table metadata has not been generated by the table metadata service, retrieving corresponding metadata for the portion of the table from the OLTP storage, and merging the corresponding metadata with the table-wide metadata. In this aspect, additionally or alternatively, the method further comprises receiving user input instructing regeneration of the table-wide metadata, scanning each partition to regenerate respective partition metadata, replacing the merged table metadata of each partition with the respective partition metadata, aggregating each respective partition metadata together to form fresh table-wide metadata, and replacing the table-wide metadata with the fresh table-wide metadata. In this aspect, additionally or alternatively, the table metadata includes table-level metadata including one or more of total inserted row count, total deleted row count, and total final row count. In this aspect, additionally or alternatively, the table metadata includes column-level metadata including at least one of average length for variable length columns, number of distinct values, and a minimum-maximum value. In this aspect, additionally or alternatively, the method further comprises, with a query optimizer, receiving a query, and based at least on the table metadata, generating a plan for responding to the query.

Another aspect provides a hybrid transactional/analytical processing (HTAP) database. The HTAP database comprises an online transaction processing (OLTP) engine, an online analytical processing (OLAP) engine provided separately from the OLTP engine, and a shared storage holding data of multiple tenants. The shared storage includes an OLTP storage holding data in row format for responding to queries of the OLTP engine, and an OLAP storage holding data in column format for responding to queries of the OLAP engine. The OLAP storage includes a delta store configured to record changes made to the OLTP storage in an update, and a base store configured to implement the update from the delta store on data in persistent storage in a flush. The HTAP database further includes a query optimizer configured to generate table metadata of the data that is updated in the flush, receive a query, and based at least on the table metadata, generate a plan for responding to the query.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A hybrid transactional/analytical processing (HTAP) database formed of a plurality of server computing devices, the HTAP database comprising:

an online transaction processing (OLTP) engine;

an online analytical processing (OLAP) engine provided separately from the OLTP engine;

a shared storage holding data, the shared storage including:

an OLTP storage holding data in row format for responding to queries of the OLTP engine; and an OLAP storage holding data in column format for responding to queries of the OLAP engine, the OLAP storage including:

a delta store configured to record changes made to the OLTP storage in an update; and a base store configured to implement the update from the delta store on data in persistent storage in a flush; and a table metadata service configured to:

generate and perform operations on table metadata of the data that is updated in the flush; and merge the table metadata of the data that is updated in the flush with prior table metadata.

2. The HTAP database of claim 1, wherein the merged table metadata is first partition metadata pertaining to data of a first partition, and the table metadata service is further configured to aggregate the first partition metadata with merged table metadata of other partitions to form table-wide metadata pertaining to an entire table of data stored in the HTAP database.

3. The HTAP database of claim 2, wherein the table metadata service is further configured to:

identify in-memory data that is not yet stored in the persistent storage;

scan the in-memory data to generate table metadata of the in-memory data; and merge the table metadata of the in-memory data with the table-wide metadata.

4. The HTAP database of claim 2, wherein the table metadata service is further configured to:

identify a portion of the table containing data that has not been flushed and for which table metadata has not been generated by the table metadata service;

retrieve corresponding metadata for the portion of the table from the OLTP storage; and merge the corresponding metadata with the table-wide metadata.

5. The HTAP database of claim 2, wherein the table metadata service is further configured to:

receive user input instructing regeneration of the table-wide metadata;

scan each partition to regenerate respective partition metadata;

replace the merged table metadata of each partition with the respective partition metadata;

aggregate each respective partition metadata together to form fresh table-wide metadata; and replace the table-wide metadata with the fresh table-wide metadata.

6. The HTAP database of claim 1, wherein the table metadata includes table-level metadata including one or more of total inserted row count, total deleted row count, and total final row count.

7. The HTAP database of claim 1, wherein the table metadata includes column-level metadata including at least one of average length for variable length columns, number of distinct values, and a minimum-maximum value.

8. The HTAP database of claim 1, wherein the OLAP engine further comprises a query optimizer configured to receive a query and, based at least on the merged table metadata, generate a plan for responding to the query.

9. The HTAP database of claim 1, wherein the OLTP storage comprises:

a log store configured to persist logs; and a page store configured to store versions of data pages and apply the logs to construct current versions of the data pages; and the shared storage comprises a replication framework configured to perform log shipping of the logs from the log store to the delta store.

10. A method for metadata generation in a hybrid transactional/analytical processing (HTAP) database, the HTAP database including an online transaction processing (OLTP) engine, an online analytical processing (OLAP) engine provided separately from the OLTP engine, and a shared storage holding data, the shared storage including an OLTP storage holding data in row format for responding to queries of the OLTP engine, and an OLAP storage holding data in column format for responding to queries of the OLAP engine, the method comprising:

recording changes made to the OLTP storage in a delta store of the OLAP storage in an update;

implementing the update from the delta store on data in persistent storage of a base store of the OLAP storage in a flush;

generating and performing operations on table metadata of the data that is updated in the flush; and merging the table metadata of the data that is updated in the flush with prior table metadata.

11. The method of claim 10, wherein the merged table metadata is first partition metadata pertaining to data of a first partition, and the method further comprises aggregating the first partition metadata with merged table metadata of other partitions to form table-wide metadata pertaining to an entire table of data stored in the HTAP database.

12. The method of claim 11, wherein the method further comprises:

identifying in-memory data that is not yet stored in the persistent storage;

scanning the in-memory data to generate table metadata of the in-memory data; and merging the table metadata of the in-memory data with the table-wide metadata.

13. The method of claim 11, wherein the method further comprises:

identifying a portion of the table containing data that has not been flushed and for which table metadata has not been generated by the table metadata service;

retrieving corresponding metadata for the portion of the table from the OLTP storage; and merging the corresponding metadata with the table-wide metadata.

14. The method of claim 11, wherein the method further comprises:

receiving user input instructing regeneration of the table-wide metadata;

scanning each partition to regenerate respective partition metadata;

replacing the merged table metadata of each partition with the respective partition metadata;

aggregating each respective partition metadata together to form fresh table-wide metadata; and replacing the table-wide metadata with the fresh table-wide metadata.

15. The method of claim 10, wherein the table metadata includes table-level metadata including one or more of total inserted row count, total deleted row count, and total final row count.

16. The method of claim 10, wherein the table metadata includes column-level metadata including at least one of average length for variable length columns, number of distinct values, and a minimum-maximum value.

17. The method of claim 10, wherein the method further comprises, with a query optimizer:

receiving a query; and based at least on the merged table metadata, generating a plan for responding to the query.

18. A hybrid transactional/analytical processing (HTAP) database formed of a plurality of server computing devices, the HTAP database comprising:

an online transaction processing (OLTP) engine;

an online analytical processing (OLAP) engine provided separately from the OLTP engine;

a shared storage holding data of multiple tenants, the shared storage including:

an OLTP storage holding data in row format for responding to queries of the OLTP engine; and an OLAP storage holding data in column format for responding to queries of the OLAP engine, the OLAP storage including:

a delta store configured to record changes made to the OLTP storage in an update; and a base store configured to implement the update from the delta store on data in persistent storage in a flush; and a query optimizer configured to:

generate table metadata of the data that is updated in the flush;

merge the table metadata of the data that is updated in the flush with prior table metadata;

receive a query; and based at least on the merged table metadata, generate a plan for responding to the query.

19. The HTAP database of claim 18, wherein the merged table metadata is first partition metadata pertaining to data of a first partition, and the query optimizer is further configured to aggregate the first partition metadata with merged table metadata of other partitions to form table-wide metadata pertaining to an entire table of data stored in the HTAP database.

20. The HTAP database of claim 19, wherein the query optimizer is further configured to:

identify in-memory data that is not yet stored in the persistent storage;

scan the in-memory data to generate table metadata of the in-memory data; and merge the table metadata of the in-memory data with the table-wide metadata.

\* \* \* \* \*